Figure 1:
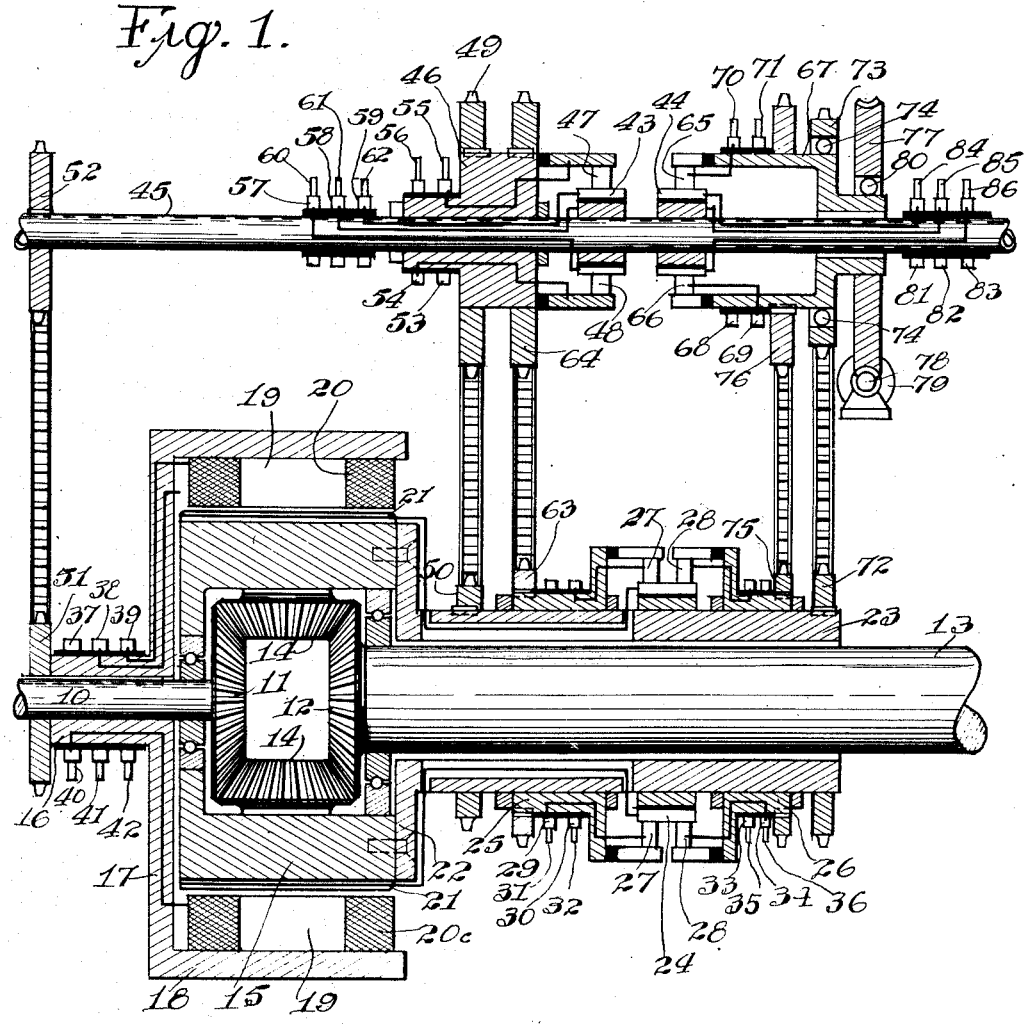

June 14, 1932.   H. L. SWARTLING   1,862,774
ELECTROMECHANICAL CHANGE SPEED GEARING
Filed April 18, 1928   3 Sheets-Sheet 1

INVENTOR
HUGO L. SWARTLING
BY Albert E. Bull
ATTORNEY

June 14, 1932.   H. L. SWARTLING   1,862,774
ELECTROMECHANICAL CHANGE SPEED GEARING
Filed April 18, 1928   3 Sheets-Sheet 2

INVENTOR.
HUGO L. SWARTLING

BY Albert C. Bell
ATTORNEY.

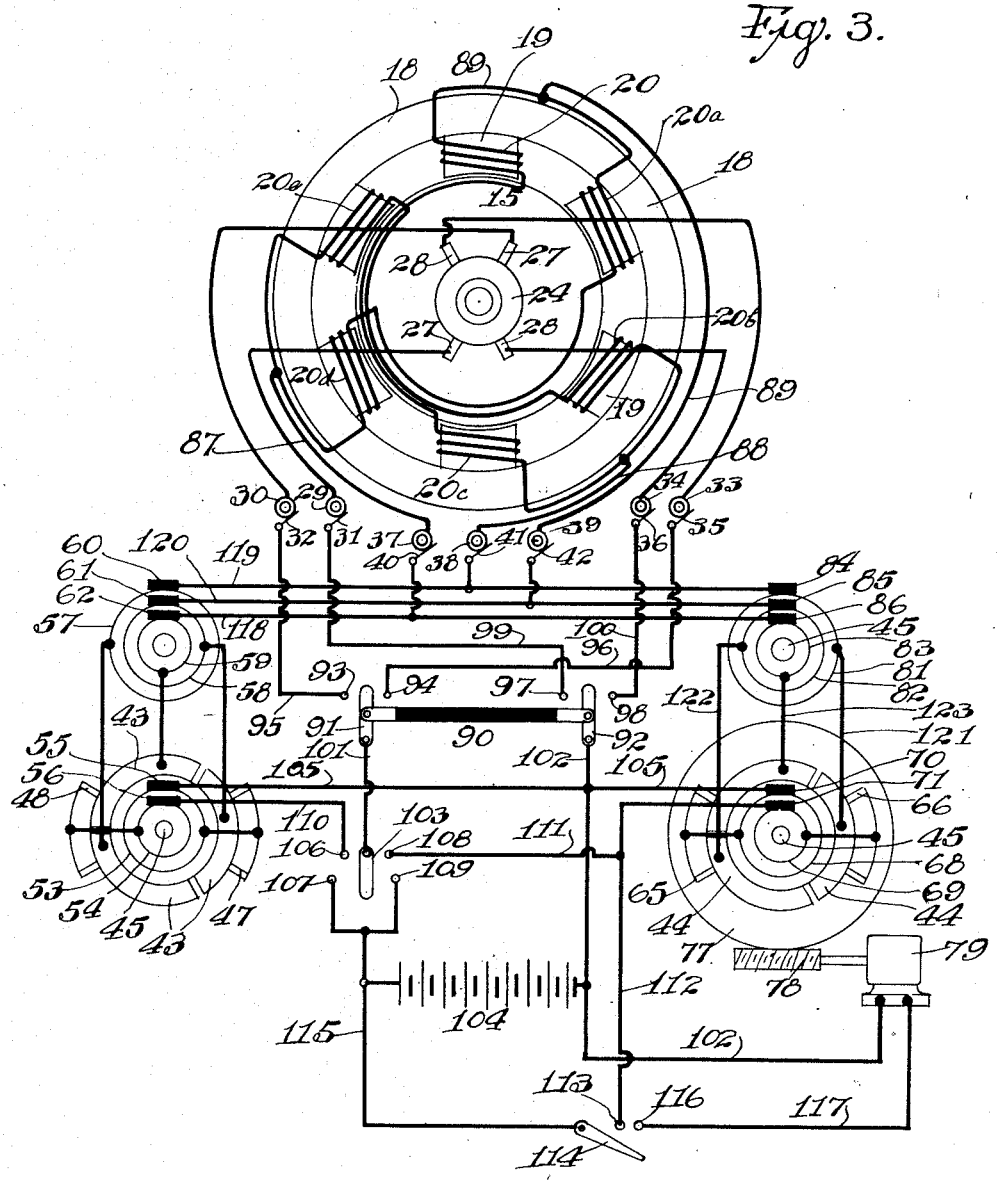

Patented June 14, 1932

1,862,774

UNITED STATES PATENT OFFICE

HUGO L. SWARTLING, OF BERLIN, GERMANY

ELECTROMECHANICAL CHANGE SPEED GEARING

Application filed April 18, 1928, Serial No. 270,864, and in Germany March 24, 1926.

My invention relates to a change speed gearing in which the speed of a driven shaft is varied automatically in accordance with the load, while the driving shaft may be rotating at uniform speed. In carrying out my invention, the power is transmitted from the driving shaft to the driven shaft by mechanical as well as by electric means.

I am aware that means have been proposed heretofore for transmitting power from a driving shaft to a driven shaft by means of clutches or couplings consisting of rotary members carrying parts of dynamo electric units, arranged so that the driving torque is produced by separately exciting the units and controlling the driving torque by external devices in the circuit or circuits, for example adjustable resistances; also that in some such constructions the entire power is transmitted through dynamo electric units of the kind referred to; also that in some cases power has been transmitted through such devices by a combination of electric and mechanical means. As far as I am aware however, the devices of the kind referred to which have been proposed heretofore, are effective in controlling the speed of the driven shaft relatively to the driving shaft, in but one direction, for example accelerating the driven shaft as desired. As far as I am aware, constructions of the kind referred to, as heretofore proposed, have not been able to both accelerate and retard the speed of the driven shaft relatively to the driving shaft, and one of the objects broadly of my present invention is to either accelerate the speed of the driven shaft or to retard the speed of the driven shaft as desired relatively to the driving shaft, by means of the same construction and arrangement of mechanism.

To produce by my invention the results referred to, gearing is introduced between the driving and the driven shaft, of the kind ordinarily known as differential gearing, and in connection with this gearing, dynamo electric units are employed between the floating member of the gearing and one of the shafts, for example the driving shaft, so that the relative rotation between the units of the dynamo electric devices will generate an electric current, the amount of the current preferably varying with the speed of one part of the dynamo electric mechanism relatively to another part. To secure the effect of acceleration and retardation of the driven shaft, I employ circuit changing devices connected with the field windings of the dynamo electric mechanism, so that the direct current supplied to energize the field windings from the armature of the dynamo electric mechanism, is caused to produce a shifting or progression of the magnetic poles in one direction or the other, producing a corresponding magnetic drag on the armature in the corresponding direction as the case may be, thus increasing or decreasing the torque communicated electrically from one of the parts of the dynamo electric mechanism to the other. In other words, by my invention I produce a rotary field in the dynamo electric mechanism, progressing electrically in one direction relatively to the mechanical rotation of the field magnets to produce an acceleration of the driven shaft, and a similar rotary field progressing electrically in the opposite direction to exert a retarding magnetic torque on the driven shaft.

While my invention is applicable for use in any mechanism requiring variable speed of a driven shaft for substantially uniform speed of a driving shaft, it is particularly adapted for use as a transmission mechanism on motor vehicles where the driving shaft may be driven at substantially uniform speed by the motor of the vehicle, and the driven shaft may be connected by suitable means with the driving wheels of the vehicle. In such an embodiment, the progression of the rotary field in one direction produces an accelerating magnetic torque and consequent increase of speed of the driven shaft and driving wheels of the vehicle tending to increase the speed of the vehicle, while a rotary field progressing in the opposite direction tends to retard the speed of the vehicle, and, if continued, to drive the vehicle in a backward direction. In any event, when the load on the driven shaft increases and the rotary field is in a direction tending to accelerate the speed of the driven shaft, the increased load tends to decrease the speed of rotation of the driven shaft with a corresponding change in the relation between the mechanical and magnetic torque communicated to the driven shaft by the gearing and the dynamo electric mechanism respectively, in such a manner that the combined driving torque communicated to the driven shaft is practically constant at all times for a given uniform speed of rotation of the driving shaft, the same being true for the retarding tendency of the magnetic torque excepting that the combined torques now tend to hold the driven shaft against rotation and to decrease its speed of rotation. It will be observed that when the retarding torque is exerted magnetically on the gearing employed, the driven shaft may not only be stopped by this means, but if the retarding torque is continued, the driven shaft is rotated in the reverse of its direction for accelerated motion and thus a means is provided by my invention for not only changing the speed of the driven shaft in a forward direction and for stopping the rotation of the driven shaft if desired, thus providing a means for securing different forward speeds of the motor vehicle, but that the reverse direction of rotation of the driven shaft may be employed to secure motion in a backward direction of the motor vehicle with which the invention may be employed.

It will be observed that for all varying conditions of operation of my transmitting device, with a rapid rotation of the members of the dynamo electric mechanism relatively to each other, the power transmitted thereby is large relatively to the power transmitted mechanically through the gearing, and that where the rotation of the members of the dynamo electric mechanism relatively to each other is small, the power transmitted thereby is small relatively to the power transmitted mechanically through the gearing. In all cases, however, the sum total of the power transmitted magnetically and the power transmitted mechanically is constant, assuming a constant speed of operation of the driving shaft.

It will be noted that with my invention, the field magnets of the dynamo electric mechanism are excited by current generated in the dynamo electric mechanism itself and that no separate exciting machine is required, and further that no regulating resistances are required in the electric circuits of the mechanism, the regulation of speed being effected automatically by the speed of the floating member of the gearing permitted or caused by the dynamo electric mechanism.

Figure 2:
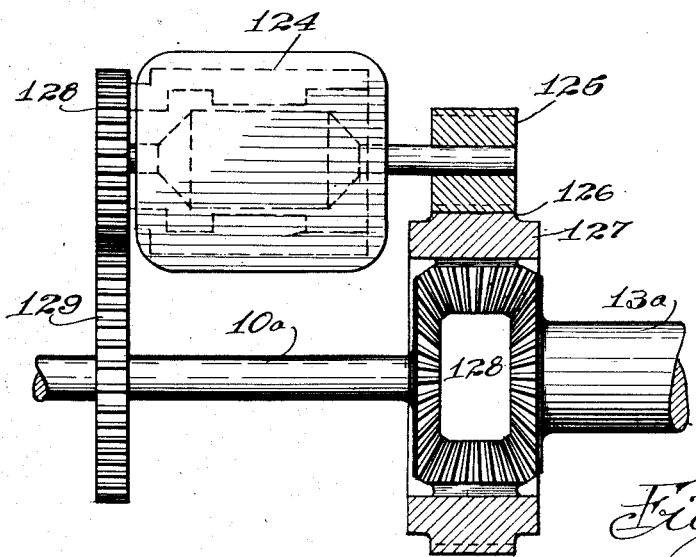
Figure 4:
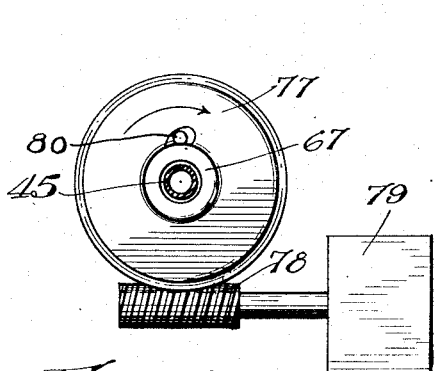
Figure 5:
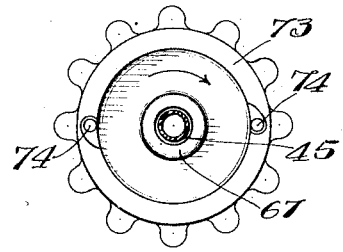

My invention will best be understood by reference to the accompanying drawings, showing a preferred embodiment thereof in which Fig. 1 is a diagrammatic mechanical view of the mechanism which may be employed in carrying out the invention, comprising longitudinal sectional views through the shafts of the mechanisms employed, Fig. 2 shows in a similar view a modified arrangement of the dynamo electric mechanism, Fig. 3 is a diagrammatic view of the circuit connections employed, Fig. 4 is a diagrammatic view of the starting motor and its gearing, and Fig. 5 is a side elevation of one of the sprocket wheels employed in connection with starting gearing.

Similar numerals refer to similar parts throughout the several views.

As shown in Fig. 1, a driving shaft 10 is rigidly connected with one of the main gears 11 of a differential gear construction, the other main gear 12 of which is rigidly connected with the driven shaft 13. The planetary gears 14, 14 of the differential gearing, are pivotally mounted on a ring 15 having suitable bearings to permit it to rotate co-axially with the shafts 10 and 13. The ring 15 is the floating member of the differential gearing and the degree to which it is permitted to move determines the amount and direction of rotation of the shaft 13, assuming the driving shaft 10 to be driven at a constant speed. The shaft 10 has also rigidly secured to it, a hub 16 from which an integral flange 17 extends to carry a tubular member 18 around the ring 15 and co-axial therewith. The member 18 is sufficiently separated from the ring 15 radially, to mount between said parts, pole pieces 19, 19 of a dynamo electric mechanism, said pole pieces being surrounded by energizing windings 20, 20c. The ring 15 serves as the armature of the dynamo electric mechanism, and carries on its outer surface suitable windings 21 co-operating with the magnetic fields produced by the pole pieces 19, when there is relative rotation between the field and armature, and when a rotary field exists in the pole pieces.

The ring 15 has rigidly secured thereto by means of a disk 22, a sleeve 23 on which is mounted a commutator 24 for collecting the current generated in the windings 21 and conducting it in the form of direct current to an external circuit as desired. The sleeve 23 carries thereon two sleeves 25 and 26 which are rotatable on the sleeve 23 independently of each other. The sleeve 25 by suitable insulated arms, carries a first pair of brushes 27 on the commutator 24, and the sleeve 26 by means of similar insulated arms carries a second pair of brushes 28 resting on the commutator 24, either pair of brushes being effective to properly collect the current generated in the armature windings and deliver it to an external circuit as direct current, depending upon the particular condition of operation of the dynamo electric machine when one or the other pair of brushes is in use. The sleeve 25 carries insulated slip rings 29 and 30 connected with the brushes 27 and upon these rings, springs 31 and 32 respectively bear for connection with the circuits of the mechanism in a manner to be described below. The sleeve 26 similarly carries slip rings 33 and 34 having brushes 35 and 36 for controlling the connection of the external circuits to the brushes 28. The sleeves 25 and 26 are held against longitudinal motion on the sleeve 23 by suitable collars as indicated.

The hub 16 carries insulated slip rings 37, 38 and 39 on which brushes 40, 41 and 42 respectively bear, said rings being connected with the field windings in a manner to be described.

To control the operation of the devices thus far described, circuit changing commutators 43 and 44 are employed, these commutators being mounted on a hollow shaft 45 disposed in substantially parallel relation with the shafts 10 and 13. It will be understood that the arrangement shown in Fig. 1 is largely diagrammatic and that in practice suitable bearings, not shown, are provided in any convenient manner for mounting the shafts 10, 13 and 45 for rotary movement.

The commutators 43 and 44 are for the purpose of shifting the magnetic poles of the dynamo electric machine magnetically around the pole pieces with a progressive motion, thus producing a magnetic field that is rotary relatively to the mechanical parts of the structure, the commutator 43 serving to rotate the field in a direction counter to the direction of mechanical motion of the pole pieces, while the commutator 44 serves to rotate the magnetic field in a forward direction relatively to the direction of rotation of the pole pieces. To accomplish this, a hub 46 is mounted to rotate on the shaft 45, being restrained from longitudinal motion thereon by suitable collars as indicated, and this hub carries insulated arms which in turn support the brushes 47 and 48 on the commutator 43. The hub 46 has rigidly secured thereto a sprocket wheel 49 for connection by a suitable sprocket chain with a sprocket wheel 50 rigidly secured to the sleeve 23. The wheel 50 is somewhat smaller in diameter than the wheel 49, and the brushes 47 and 48 are therefore rotated at a somewhat slower rate than the rate of rotation of the sleeve 23 and the armature 15. The shaft 10 has rigidly secured thereto a sprocket wheel 51 for driving by means of a sprocket chain a second sprocket wheel 52 rigidly secured to the shaft 45. The wheels 51 and 52 are of the same diameter and this results in the rate of rotation of the shaft 45 being the same as the rate of rotation of the pole pieces 19. The hub 46 carries insulated slip rings 53 and 54 connected respectively with the brushes 47 and 48, these rings having brushes 55 and 56 resting upon them. The segments of the commutator 43 are connected through the shaft 45 with insulated slip rings 57, 58 and 59 having brushes 60, 61 and 62 respectively bearing thereon.

By suitable connection of the slip rings in a manner to be described, the construction described results in the commutator segments 43 corresponding to the several pairs of pole pieces 19, rotating at the same rate as said pole pieces and it further results in the brushes 47 and 48 rotating at a somewhat slower rate, to the end that a rotary field may be set up in the field poles having a progression against the direction of rotation of the field poles. To maintain the brushes 27 in their proper commutating relation on the commutator 24, for motion of the magnetic poles by rotation of the field due to the brushes 47 and 48, the sleeve 25 has rigidly secured thereto a sprocket wheel 63 connected by a sprocket chain with a second sprocket wheel 64 rigidly secured to the hub 46, the sprocket wheels 63 and 64 being of the same diameter. In this manner the brushes 27 are caused to rotate synchronously with the brushes 47 and 48, and a definite angular relation may therefore be maintained between the axis of commutation of the brushes 27 and the location of the magnetic poles produced at any instant in the pole pieces by the brushes 47 and 48.

The commutator 44 has bearing upon it, brushes 65 and 66 carried by insulated arms secured to a rotary tubular member 67 mounted in suitable bearings not shown, for rotation about an axis co-axial with the axis of the shaft 45. The member 67 carries insulated slip rings 68 and 69 connected electrically respectively with the brushes 65 and 66 and on these rings bear brushes 70 and 71. The sleeve 23 has rigidly secured thereto a sprocket wheel 72 connected by a sprocket chain with a second sprocket wheel 73 carried by the member 67, clutches 74 being interposed as shown in Fig. 5, between the sprocket wheels 73 and the member 67 to permit free movement of the member 67 ahead of the sprocket wheel 73 for a purpose to be described. When however, the tendency of the sprocket wheel 73 is to rotate faster than the member 67, the clutch members 74 afford driving engagement between the wheel 73 and the member 67, so that the member 67 is rotated at the same rate as the wheel 73. The wheel 72 is of somewhat greater diameter than the wheel 73, as a result of which, when the member 67 is driven by the wheel 73, its rate of rotation is somewhat greater than the rate of rotation of the sleeve 23, and therefore greater than the rate of rotation of the armature 15. Since the commutator 44 is carried by the shaft 45, and the shaft 45 rotates at the same rate as the field poles 19, the commutator 44 and brushes 65 and 66 provide a means for producing a rotary field in the pole pieces 19, progressively moving the poles in the direction of rotation of the pole pieces.

As will more fully appear below, to effect a retardation of the rotation of the shaft 13, or to cause it to move in a reverse direction to that of the driving shaft 10, the commutator 43 and its brushes are connected in the operation circuits, as well as the brushes 27, 27 at which time the commutator 44 and the brushes 28, 28 are disconnected from the circuits, and to effect an acceleration of the rotation of the shaft 13 in the direction of rotation of the shaft 10, the commutator 44 and its brushes, as well as the brushes 28, 28 are connected in the operating circuits, at which time the commutator 43 and the brushes 27, 27 are inactive. During the use of the commutator 44, the brushes 28, 28 are maintained in their proper axis of commutation relatively to the rotary magnetic field, by sprocket wheels 75 and 76 rigidly carried by the sleeve 26 and the member 67 respectively and connected by a suitable sprocket chain, the diameters of the wheels 75 and 76 being the same as each other.

The member 67 carries a worm wheel 77 engaging a worm 78 driven by a motor 79, for the purpose of starting the shaft 10 when the latter is connected with a source of power of the internal combustion motor type, so that the latter motor may be started by means of a forwardly moving rotary field as will be described. Driving action between the worm wheel 77 and the member 67 is effected by a clutch 80 as indicated in Fig. 4, permitting the member 67 to rotate freely ahead of the worm wheel 77 but imparting positive driving effort to the member 67 when the tendency of the worm wheel 77 is to rotate faster than the member 67. The shaft 45 carries insulated slip rings 81, 82 and 83 connected respectively with the segments of the commutator 44 and upon these slip rings brushes 84, 85 and 86 respectively bear.

As shown in Fig. 3, the commutators 43 and 44 are shown on the left and right hand sides respectively of the figure in diagrammatic developed view, the slip rings associated with the segments of each commutator being shown above it for the sake of clearance, and each slip ring being indicated by a single circle.

As shown in this figure, the ring 37 is connected by wire 87 with one terminal of each of the field windings 20d and 20e; the ring 38 is connected by wire 88 with one terminal of each of the field windings 20b and 20c; and the ring 39 is connected by wire 89 with one terminal of each of the field windings 20 and 20a. The other terminals of the field windings 20, 20a and 20b respectively are connected with the others of the terminals of the field windings 20c, 20d and 20e. A switch 90 having switch blades 91 and 92 is provided for connecting in circuit either the brushes 27, 27 or the brushes 28, 28 as desired, the former being connected when the commutator 43 is employed to retard the rotation of the driven shaft and the brushes 28, 28 being used when the commutator 44 is connected to accelerate the rotation of the driven shaft. The contacts 93 and 94 of the switch blade 91 are connected respectively by wires 95 and 96 with brushes 32 and 35; the contacts 97 and 98 and the switch blade 92 are connected by wires 99 and 100 with brushes 31 and 36 respectively. The pivotal points of the switch blades 91 and 92 are connected respectively with wires 101 and 102, the former wire extending to the pivotal point of switch 103 and the latter extending to one terminal of the starting motor 79 and being also connected with one terminal of a storage battery 104. The wire 102 is also connected with wire 105 which connects the brushes 55 and 70. The switch 103 in one of its operative positions, makes contact with a first pair of contacts 106 and 107 and in the other of its operative positions makes contact with a second pair of contacts 108 and 109. The contact 106 is connected by wire 110 with brush 56; the contact 108 is connected by wire 111 with wire 112 which in turn connects the brush 71 with the contact 113 of starting switch 114; the contacts 107 and 109 are connected together and with wire 115, which in turn is connected with the other terminal of the battery 104 and also with the pivotal point of switch 114. The switch 114 is provided with a second contact 116 also engaged by the switch in its closed position, this contact being connected by wire 117 with the other terminal of the starting motor 79.

The brushes 40, 41 and 42 are connected respectively with wires 118, 119, and 120 which in turn connect respectively the brushes 62 and 86, 60 and 84, and 61 and 85.

When the apparatus is being used to accelerate the speed of the driven shaft 13, or to effectively communicate magnetic torque to the shaft for an increase of load tending to decrease the speed of rotation of the driven shaft, the switches 90 and 103 are in their right hand position indicated in Fig. 3, and the starting switch 114 is in its open position. Relative rotation at this time between the field poles 19 and the armature 15 generates a current in the armature winding which flows through one of the brushes 28, for example the upper one of said brushes to ring 33, brush 35, wire 96, switch blade 91, wire 101, switch blade 103, from which point the current flows in two paths to wires 111 and 115 to wire 112 and brush 71 to energize the field windings, and also through wire 115 to one terminal of the storage battery 104 to charge it. From the battery 104, the charging current returns by wire 102 to switch blade 92 and thence through wire 100, brush 36 and ring 34 to the other one of brushes 28 thus completing the charging circuit. Current delivered to the brush 71 flows through ring 69, brush 66, one of the commutator segments 44, through wire 121 to ring 81, brush 84, wire 119, brush 41, ring 38, wire 88 to field windings 20b and 20c respectively from which windings the current flows in two paths to field windings 20e and 20 and thus to wires 87 and 89 respectively; the current flowing in wire 89 flows through ring 39, brush 42 and wire 120 to brush 85, ring 82, wire 122 to one of the other commutator segments 44, brush 65, ring 68 and thus to brush 70; current returning through wire 87 flows through ring 37, brush 40, wire 118, brush 86, ring 83, wire 123 to the other of the commutator segments 44, brush 65, ring 68 and thus to brush 70; from this point the current flows through wire 105 to wire 102 and thus back to the other one of the armature brushes 28, following the same path above traced for the charging current. As above described, however, the brushes 65 and 66 are rotating at a speed somewhat greater than the speed of rotation of the commutator 44. This shifts the current flow through the field windings by the changing connections through the segments of the commutator 44, so that a progression of the magnetic poles is produced relatively to the pole pieces themselves and a resulting rotary field is set up tending to rotate with it the armature 15 and therefore the driven shaft 13. In the event the load on the driven shaft is small, a corresponding acceleration of the armature results, due to the magnetic drag of the rotary field being sufficient to rotate the floating member of the differential gearing against the load at that time required to be driven by it, and the extreme of this condition is reached when the load on the driven shaft, frictionally and otherwise, becomes sufficient to prevent further acceleration of the driven shaft; for an increase of load on the driven shaft however, the speed of the driven shaft decreases somewhat, producing a greater relative rotation between the rotary field and the armature, accompanied by the production of a correspondingly increased magnetic torque between the field and the armature sufficient to maintain the driven shaft in operation for the increased load. In this manner the rotary field set up in an accelerating direction is effective at all times in producing a magnetic torque on the differential gearing tending to accelerate the speed of the driven shaft, the amount of this magnetic torque varying proportionally to the load exerted upon the driven shaft.

When it is desired to retard the rotation of the driven shaft, for example when a motor vehicle equipped with the mechanism is going down a hill, or when it is desired to rotate the driven shaft in a reverse direction, the switches 90 and 103 are moved to their alternate position so that the switch blades 91 and 92 are in engagement respectively with the contacts 93 and 97 and the switch blade 103 is in engagement with the contacts 106 and 107. For this condition, the brushes 27 are connected in circuit through the connections above described in the same manner as the brushes 28 were previously connected, current is caused to flow through the battery 104 to charge it in the manner above described, and current is supplied by the brush 56 to the commutator 43 and from the commutator 43 to the brush 55 and thus back to one of the brushes 27 in the same manner above described for the brushes 28 and the commutator 44 and through the same circuits, the only difference being that in this case the rotary magnetic field set up in the pole pieces progresses in a direction the reverse of the mechanical rotation of the pole pieces, and thus tends to oppose or stop the mechanical rotation of the armature and correspondingly exerts a retarding torque on the driven shaft 13. For this condition, where the driving effort in a forward action exerted on the shaft 13 is relatively great, the shaft will continue to rotate in a forward direction, but have exerted upon it a considerable retarding torque; where however, the driving effort is of less amount, for example where a motor vehicle equipped with the mechanism is continuing in motion on a substantially level road due only to its inertia, the retarding torque referred to exerts a braking effect on the driven shaft and soon brings it to rest, after which if the retarding torque is continued, it causes rotation of the driven shaft in a reverse direction, making the mechanism particularly adapted for driving a motor vehicle forwardly or backwardly as desired.

When the mechanism is used in connection with an internal combustion motor connected with the driving shaft, for example as a part of a motor vehicle transmission equipment, and the motor and driving shaft are at rest and it is desired to start the driving motor, this may be accomplished by moving the switches 90 and 103 to their right hand positions and moving the starting switch 114 to its closed position. At the instant of starting the mechanism, there is of course, no magnetic torque between the field and the armature, for the parts are at rest. The closing of the switch 114 closes a circuit as follows: battery 104, wire 115, switch 114, contact 116, wire 117, starting motor 79, wire 102 back to battery 104. This rotates the worm wheel 77, the clutch 80 engages the member 67 and rotates it and drives it ahead of the sprocket wheel 73 on account of the latter being then at rest, this motion being permitted by the clutches 74. The closure of the switch 114 closes a second circuit from the battery 104 as follows: wire 115, switch 114, contact 113, wire 112 to brush 71 and thence through the same path above traced for the switches 90 and 103 in their right hand position, back to brush 70 and to the battery 104. It will be noted from the circuits above traced that the armature windings and the field windings are at all times in series connection, whether during the starting or running relation and as a result of current flow from the storage battery during the interval of starting, and the rotation of brushes 65 and 66 produced by the starting motor 79 as just described, a rotary field is produced in the pole pieces 19 in the same manner above described for acceleration of the driven shaft. At this time however, in order to start the motor, the driven shaft is held against rotation and the effect of the rotary field on the armature associated with the differential gear, is to drive the driving shaft in a forward direction and hence to drive the driving motor in the direction to start it. As soon as the driving motor is started, its rotation rapidly increases and as soon as the speed of the sprocket wheel 73 equals that of the member 67, the clutches 74 engage to drive the member 67 by means of the wheel 73 and from that point on the clutch 80 permits the worm wheel 77 to be free from the member 67 so that the member 67 may be driven at any speed dictated by the rotation of the sleeve 23. After starting the driving motor, the switch 114 is moved to its open position, permitting the motor 79 to stop.

In the modified construction shown in Fig. 2, a dynamo electric machine consisting of a field and armature is shown diagrammatically at 124, the armature of which is rigidly connected with a pinion 125 meshing with a gear 126 carried around the floating member 127 of the differential gear 128 employed to connect the driving shaft 10a with the driven shaft 13a. The field of the machine 124 is rigidly secured to a gear 128 meshing with a gear 129 rigidly secured to the driving shaft 10a, and in this way a magnetic torque transmitting means is provided between the driving shaft and the floating member of the differential gearings which is the equivalent of that above described. The machine 124 is provided with any convenient support not shown which is fixed relatively to the housing of the shafts 10a and 13a. It will at once be observed that the control mechanism above described may be applied to the modified construction shown in Fig. 2 with the same advantages just described above and that in some particulars the circuit connections may be simpler than the ones described.

While I have shown my invention in the particular embodiment above described, it will be understood that I do not limit myself to this exact construction as I may employ equivalents known to the art at the time of the filing of this application without departing from the scope of the appended claims.

What I claim is:

1. In a variable speed transmission mechanism, the combination of a driving shaft, a driven shaft, a differential gearing connecting said shafts and having a floating member, cooperating armature and field elements carried by one of said shafts and said member, devices producing a rotary field in said field element tending to change the speed of the driven shaft for constant speed of the driving shaft, an internal combustion motor connected with said driving shaft, a battery, switching mechanism for connecting said battery with said elements through said devices with said shafts at rest, and a second motor for actuating said devices to produce a rotary field in said field element with said shafts at rest to rotate said driving shaft and start said internal combustion motor.

2. In a variable speed transmission mechanism, the combination of a driving shaft, a driven shaft, a differential gearing connecting said shafts and having a floating member, cooperating armature and field elements carried by one of said shafts and said member, devices producing a rotary field in said field element tending to change the speed of the driven shaft for constant speed of the driving shaft, an internal combustion motor connected with said driving shaft, a battery, switching mechanism for connecting said battery with said elements through said devices with said shafts at rest, a second motor for actuating said devices to produce a rotary field in said field element with said shafts at rest to rotate said driving shaft and start said internal combustion motor, and connections between said elements and said battery for charging said battery by current generated in said elements.

3. In a driving mechanism for a motor vehicle, the combination of a driving shaft, a vehicle driving motor connected with said driving shaft, a driven shaft, a differential gearing connecting said shafts and having a floating member, cooperating armature and field elements carried by one of said shafts and said member to generate electric current, windings and circuit connections for exciting said field element by said current, and circuit changing devices for shifting the magnetic poles in said field element in a first direction to accelerate the speed of the vehicle and in the reverse direction to reverse the direction of torque on the driven shaft.

4. In a driving mechanism for a motor vehicle, the combination of a driving shaft, a vehicle driving motor connected with said driving shaft, a driven shaft, a differential gearing connecting said shafts and having a floating member, cooperating armature and field elements carried by one of said shafts and said member to generate electric current, windings and circuit connections for exciting said field element by said current, first circuit changing devices for shifting the magnetic poles in said field element in a first direction to accelerate the speed of the vehile, second circuit changing devices for shifting said magnetic poles in the opposite direction to stop and reverse the motion of the vehicle, and switching mechanism for connecting in said circuit connections either of said circuit changing devices as desired.

5. In a driving mechanism for a motor vehicle, the combination of a driving shaft, a vehicle driving motor connected with said driving shaft, a driven shaft, a differential gearing connecting said shafts and having a floating member, cooperating armature and field elements carried by one of said shafts and said member to generate electric current, windings and circuit connections for exciting said field element by said current, circuit changing devices for shifting the magnetic poles in said field elements in a first direction to accelerate the speed of the vehicle and in the reverse direction to reverse the direction of torque on the driven shaft, commutating mechanism for delivering direct current from said armature element, and connections from said commutating mechanism for delivering said direct current to the circuit connections of said field windings.

6. In a driving mechanism for a motor vehicle, the combination of a driving shaft, a vehicle driving motor connected with said driving shaft, a driven shaft, a differential gearing connecting said shafts and having a floating member, cooperating armature and field elements carried by one of said shafts and said member to generate electric current, windings and circuit connections for exciting said field element by said current, first circuit changing devices for shifting the magnetic poles in said field element in a first direction to accelerate the speed of the vehicle, second circuit changing devices for shifting said magnetic poles in the opposite direction to stop and reverse the motion of the vehicle, switching mechanism for connecting in said circuit connections either of said circuit changing devices as desired, commutating mechanism for delivering direct current from said armature element, and connections from said commutating mechanism for delivering said direct current to the circuit connections of said field windings, said commutating mechanism including two sets of brushes, each of said sets cooperating with one of said circuit changing devices to effect a desired commutation axis with the corresponding shifting field.

7. In a driving mechanism for a motor vehicle, the combination of a driving shaft, a vehicle driving motor connected with said driving shaft, a driven shaft, a differential gearing connecting said shafts and having a floating member, cooperating armature and field elements carried by one of said shafts and said member to generate electric current, windings and circuit connections for exciting said field element by said current, circuit changing devices for shifting the magnetic poles in said field element in a first direction to accelerate the speed of the vehicle and in the reverse direction to reverse the direction of torque on the driven shaft, a battery for supplying current to said elements with said shafts at rest, and a motor for actuating said circuit changing devices to shift the magnetic poles in said field element resulting from current flow from said battery to start the driving motor of the vehicle.

8. In a driving mechanism for a motor vehicle, the combination of a driving shaft, a vehicle driving motor connected with said driving shaft, a driven shaft, a differential gearing connecting said shafts and having a floating member, cooperating armature and field elements carried by one of said shafts and said member to generate electric current, windings and circuit connections for exciting said field element by said current, first circuit changing devices for shifting the magnetic poles in said field element in a first direction to accelerate the speed of the vehicle, second circuit changing devices for shifting said magnetic poles in the opposite direction to stop and reverse the motion of the vehicle, switching mechanism for connecting in said circuit connections either of said circuit changing devices as desired, a battery for supplying current to said elements with said shafts at rest, and a motor for actuating said first circuit changing devices to shift the magnetic poles in said field element resulting from current flow from said battery to start the driving motor of the vehicle.

9. In a driving mechanism for a motor vehicle, the combination of a driving shaft, a vehicle driving motor connected with said driving shaft, a driven shaft, a differential gearing connecting said shafts and having a floating member, cooperating armature and field elements carried by one of said shafts and said member to generate electric current, windings and circuit connections for exciting said field element by said current, circuit changing devices for shifting the magnetic poles in said field element in a first direction to accelerate the speed of the vehicle and in the reverse direction to reverse the direction of torque on the driven shaft, commutating mechanism for delivering direct current from said armature element, connections from said commutating mechanism for delivering said direct current to the circuit connections of said field windings, a battery for supplying current to said elements with said shafts at rest, and a motor for actuating said circuit changing devices to shift the magnetic poles in said field element resulting from current flow from said battery to start the driving motor of the vehicle.

10. In a driving mechanism for a motor vehicle, the combination of a driving shaft, a vehicle driving motor connected with said driving shaft, a driven shaft, a differential gearing connecting said shafts and having a floating member, cooperating armature and field elements carried by one of said shafts and said member to generate electric current, windings and circuit connections for exciting said field element by said current, first circuit changing devices for shifting the magnetic poles in said field element in a first direction to accelerate the speed of the vehicle, second circuit changing devices for shifting said magnetic poles in the opposite direction to stop and reverse the motion of the vehicle, switching mechanism for connecting in said circuit connections either of said circuit changing devices as desired, commutating mechanism for delivering direct current from said armature element, connections from said commutating mechanism for delivering said direct current to the circuit connections of said field windings, said commutating mechanism including two sets of brushes, each of said sets cooperating with one of said circuit changing devices to effect a desired commutation axis with the corresponding shifting field, a battery for supplying current to said elements with said shafts at rest, and a motor for actuating said first circuit changing devices to shift the magnetic poles in said field element resulting from current flow from said battery to start the driving motor of the vehicle.

In witness whereof, I hereunto subscribe my name this 5th day of March, A. D. 1928.

HUGO L. SWARTLING.